US007787697B2

(12) United States Patent
Ritzau et al.

(10) Patent No.: US 7,787,697 B2
(45) Date of Patent: *Aug. 31, 2010

(54) IDENTIFICATION OF AN OBJECT IN MEDIA AND OF RELATED MEDIA OBJECTS

(75) Inventors: Tobias Robert Jan Ritzau, Verberod (SE); Marcus Liwell, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1099 days.

This patent is subject to a terminal disclaimer.

(21) Appl. No.: 11/423,337

(22) Filed: Jun. 9, 2006

(65) Prior Publication Data

US 2007/0286463 A1 Dec. 13, 2007

(51) Int. Cl.
*G06K 9/62* (2006.01)
*G06K 9/00* (2006.01)
(52) U.S. Cl. ....................... 382/224; 382/115
(58) Field of Classification Search ................ 382/224
See application file for complete search history.

(56) References Cited

U.S. PATENT DOCUMENTS

| | | | |
|---|---|---|---|
| 5,666,442 A | 9/1997 | Wheeler | |
| 5,682,439 A * | 10/1997 | Beernink et al. | 382/187 |
| 6,654,683 B2 * | 11/2003 | Jin et al. | 701/207 |
| 6,731,239 B2 * | 5/2004 | Wall et al. | 342/357.1 |
| 6,825,875 B1 * | 11/2004 | Strub et al. | 348/207.99 |
| 2002/0114519 A1 * | 8/2002 | Mastrianni et al. | 382/199 |
| 2003/0115490 A1 * | 6/2003 | Russo et al. | 713/202 |
| 2003/0161507 A1 * | 8/2003 | Lawandy | 382/118 |
| 2004/0117191 A1 * | 6/2004 | Seshadri | 704/275 |
| 2005/0057669 A1 * | 3/2005 | Wakefield | 348/239 |
| 2005/0119032 A1 * | 6/2005 | Airas | 455/566 |
| 2006/0028556 A1 * | 2/2006 | Bunn et al. | 348/211.99 |
| 2006/0047704 A1 * | 3/2006 | Gopalakrishnan | 707/104.1 |
| 2007/0182540 A1 * | 8/2007 | Marman | 340/506 |
| 2008/0300854 A1 * | 12/2008 | Eibye | 704/3 |
| 2009/0122198 A1 * | 5/2009 | Thorn | 348/715 |

FOREIGN PATENT DOCUMENTS

| | | |
|---|---|---|
| WO | WO 2005/065283 A2 | 7/2005 |
| WO | WO 2005/096760 A2 | 10/2005 |
| WO | WO 2006/025797 A1 | 3/2006 |
| WO | WO 2006025797 A1 * | 3/2006 |

OTHER PUBLICATIONS

Facial recognition demo from www.myheritage.com; May 19, 2006 (print date); 1 page.
SongIDentity from www.rocketmobile.com; May 19, 2006 (print date); 1 page.
Written Opinion and International Search Report for corresponding PCT application; dated Jun. 21, 2007; 10 pages.
International Preliminary Report on Patentability for corresponding international application No. PCT/IB2006/054723; dated Oct. 7, 2008; 8 pages.

* cited by examiner

*Primary Examiner*—Matthew C Bella
*Assistant Examiner*—David P Rashid
(74) *Attorney, Agent, or Firm*—Harrity & Harrity, LLP

(57) ABSTRACT

A method obtains media on a device, provides identification of an object in the media via image/video recognition and audio recognition, and displays on the device identification information based on the identified media object.

15 Claims, 14 Drawing Sheets

IDENTIFICATION OF AN OBJECT IN MEDIA AND OF RELATED MEDIA OBJECTS

BACKGROUND

1. Field of the Invention

Implementations described herein relate generally to devices and, more particularly, to a device that identifies objects contained in media.

2. Description of Related Art

It is frustrating when one sees or hears a person in media (e.g., video, image, audio, etc.), and cannot determine who the person is or why one remembers the person. Currently, a user of a mobile communication device may be able to identify a song with the mobile communication device. For example, Song IDentity™, available from Rocket Mobile, Inc., allows a user to identify a song by using a mobile communication device to record a few seconds of a song, and provides the artist, album, and title of the song to the device. Unfortunately, such an identification system is lacking for video, images, and audio (other than songs) for identifying people and providing information about such people.

Facial recognition technology has improved significantly during the past few years, making it an effective tool for verifying access to buildings and computers. However, it is less useful for identifying unknown individuals in a crowded stadium or airport. Furthermore, current facial recognition technology fails to identify all objects contained in video, images, and audio, and fails to provide identification information about such objects.

SUMMARY

According to one aspect, a method may include obtaining media on a device, providing identification of an object in the media via image/video recognition and audio recognition, and displaying on the device identification information based on the identified media object.

Additionally, the method may include receiving the media via the device.

Additionally, the method may include capturing the media with the device.

Additionally, audio recognition may be performed if the image/video recognition fails to identify the media object within a predetermined level of accuracy.

Additionally, image/video recognition may be performed if the audio recognition fails to identify the media object within a predetermined level of accuracy.

Additionally, the method may include marking a face of the media object to identify the object through image/video recognition.

Additionally, the method may include displaying image/video recognition results identifying the media object.

Additionally, the method may include displaying identification information for a user selected image/video recognition result.

Additionally, the method may include displaying audio recognition results identifying the media object.

Additionally, the method may include displaying identification information for a user selected audio recognition result.

Additionally, the method may include displaying image/video and audio recognition results identifying the media object.

Additionally, the method may include displaying identification information for a user selected image/video and audio recognition result.

Additionally, the media may include one of an image file, an audio file, a video file, or an animation file.

Additionally, the media object may include one of a person, a place, or a thing.

Additionally, the identification information may include at least one of biographical information about the identified media object, a link to information about the identified medial object, or recommendations based on the identified media object.

According to another aspect, a device may include means for obtaining media on a device, means for providing identification of an object in the media via facial and voice recognition, and means for displaying on the device identification information based on the identified media object.

According to yet another aspect, a device may include a media information gatherer to obtain media information associated with the device, and processing logic. The processing logic may provide identification of an object in media via facial and voice recognition, display a facial and voice recognition result identifying the media object, and display identification information for one of a user selected facial and voice recognition result.

Additionally, the media information gatherer may include at least one of a camera, a microphone, a media storage device, or a communication device.

Additionally, when identifying the media object through facial recognition, the processing logic may be configured to determine a location of a face in the media object.

Additionally, when identifying the media object through facial recognition, the processing logic may be configured to determine a location of a face in the media object based on a user input.

According to a further aspect, a device may include a memory to store instructions, and a processor to execute the instructions to obtain media on the device, provide identification of an object in the media via facial and voice recognition, and display on the device identification information based on the identified media object.

According to still another aspect, a method may include obtaining video on a device, providing identification of an object in the video, while the video is playing on the device, via facial recognition or voice recognition, and displaying on the device identification information based on the identified media object.

According to a still further aspect, a method may include obtaining media on a device, providing identification of a thing in the media based on a comparison of the media thing and database of things, and displaying on the device identification information based on the identified media thing.

Additionally, the thing may include at least one of an animal, print media, a plant, a tree, a rock, or a cartoon character.

According to another aspect, a method may include obtaining media on a device, providing identification of a place in the media based on a comparison of the media place and database of places, and displaying on the device identification information based on the identified media place.

Additionally, the place may include at least one of a building, a landmark, a road, or a bridge.

Additionally, the method may further include displaying a map on the device based on the location of the identified media place, the map including a representation of the identified media place.

According to a further aspect, a method may include obtaining media on a device, providing identification of an object in the media based on voice recognition and text recognition of the object, and displaying on the device identification information based on the identified media object.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 1:
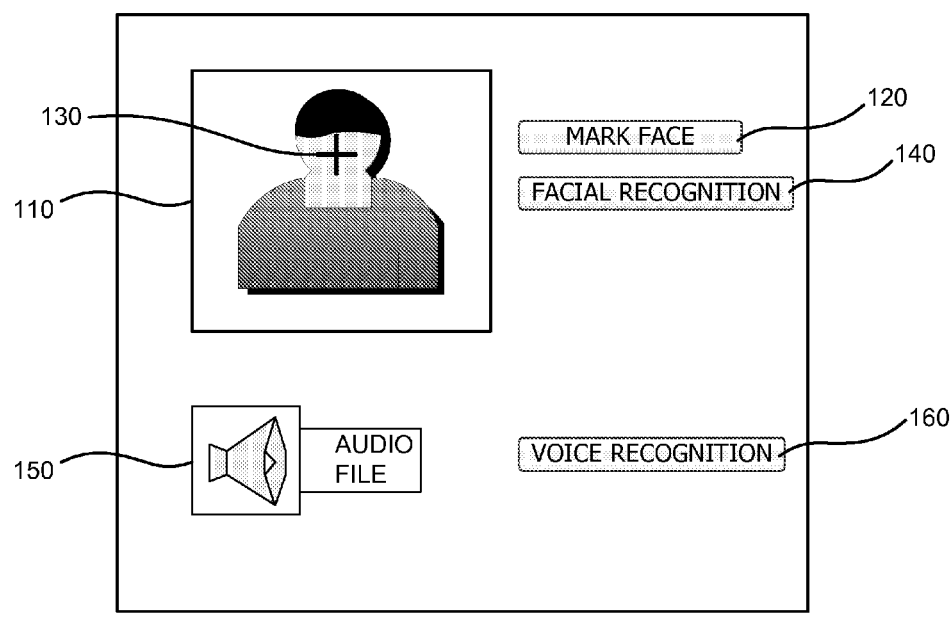
FIG. 1 is an exemplary diagram illustrating concepts consistent with principles of the invention.

The following detailed description of the invention refers to the accompanying drawings. The same reference numbers in different drawings may identify the same or similar elements. Also, the following detailed description does not limit the invention.

Implementations consistent with principles of the invention may relate to media identification based on facial and/or voice recognition results, and display of identification information related to the facial and/or voice recognition results. By using media identification (e.g., facial recognition technology to identify a person(s) in images and/or video, and/or voice recognition technology to identify a person(s) in audio, e.g., a sound byte from a movie), a person(s) may be identified and information about the person(s) may be displayed on a device. For example, a device may retrieve media (e.g., an image) from storage or another mechanism (e.g., by taking a picture), and may permit a user to select a face shown in the image. Facial recognition may be performed on the face and may identify a person(s) shown in the image. Device may provide identification information about the person(s) identified by the facial recognition.

"Media," as the term is used herein, is to be broadly interpreted to include any machine-readable and machine-storable work product, document, electronic media, etc. Media may include, for example, information contained in documents, electronic newspapers, electronic books, electronic magazines, online encyclopedias, electronic media (e.g., image files, audio files, video files, animation files, web casts, podcasts, etc.), etc.

A "document," as the term is used herein, is to be broadly interpreted to include any machine-readable and machine-storable work product. A document may include, for example, an e-mail, a web site, a file, a combination of files, one or more files with embedded links to other files, a news group posting, any of the aforementioned, etc. In the context of the Internet, a common document is a web page. Documents often include textual information and may include embedded information (such as meta information, images, hyperlinks, etc.) and/or embedded instructions (such as Javascript, etc.).

"Identification information," as the term is used herein, is to be broadly interpreted to include any information deemed to be pertinent to any object being identified in media. For example, objects may include persons (e.g., celebrities, musicians, singers, movie stars, athletes, friends, and/or any person capable of being identified from media), places (e.g., buildings, landmarks, roads, bridges, and/or any place capable of being identified from media), and/or things (e.g., animals, print media (e.g., books, magazines, etc.), cartoon characters, film characters (e.g., King Kong), plants, trees, and/or any "thing" capable of being identified from media).

A "link," as the term is used herein, is to be broadly interpreted to include any reference to/from content from/to other content or another part of the same content.

A "device," as the term is used herein, is to be broadly interpreted to include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a camera (e.g., video and/or still image camera), a sound recorder (e.g., a microphone), a Doppler receiver, and/or global positioning system (GPS) receiver; a laptop; a GPS device; a camera (e.g., video and/or still image camera); a sound recorder (e.g., a microphone); and any other computation or communication device capable of displaying media, such as a personal computer, a home entertainment system, a television, etc.

FIG. 1 is an exemplary diagram illustrating concepts consistent with principles of the invention. As shown in FIG. 1, a display 100 of a device may include an image or a video (image/video) 110 selected by a user. For example, in one implementation, image/video 110 may be a movie or a music video currently being displayed on display 100. Display 100 may include a mark face item 120 (e.g. an icon, link, button, and/or other similar selection mechanisms), which upon selection may enable a user to mark (e.g., with a cursor 130) a portion of the face of image/video 110. If the face is marked with cursor 130, a user may select a facial recognition item 140 (e.g. an icon, link, button, and/or other similar selection mechanisms) provided on display 100 and perform facial recognition of image/video 110, as described in more detail below. As further shown in FIG. 1, display 100 may include an audio file item 150 (e.g. an icon, link, button, and/or other similar selection mechanisms), which may be displayed when a user is listening to an audio file. For example, in one implementation, a user may listen to music (e.g., digital music, MP3 , MP4 , etc.) on the device. A user may select a voice recognition item 160 (e.g. an icon, link, button, and/or other similar selection mechanisms) provided on display 100 and perform voice recognition of the audio file, as described in more detail below. In another implementation, a user may select voice recognition item 160 and perform voice recognition of a voice in a movie (e.g., video 110) currently being displayed on display 100. In still another implementation, a user may perform both facial and voice recognition on media (e.g., video 110) currently provided on display 100.

Exemplary Device Architecture

Figure 2:
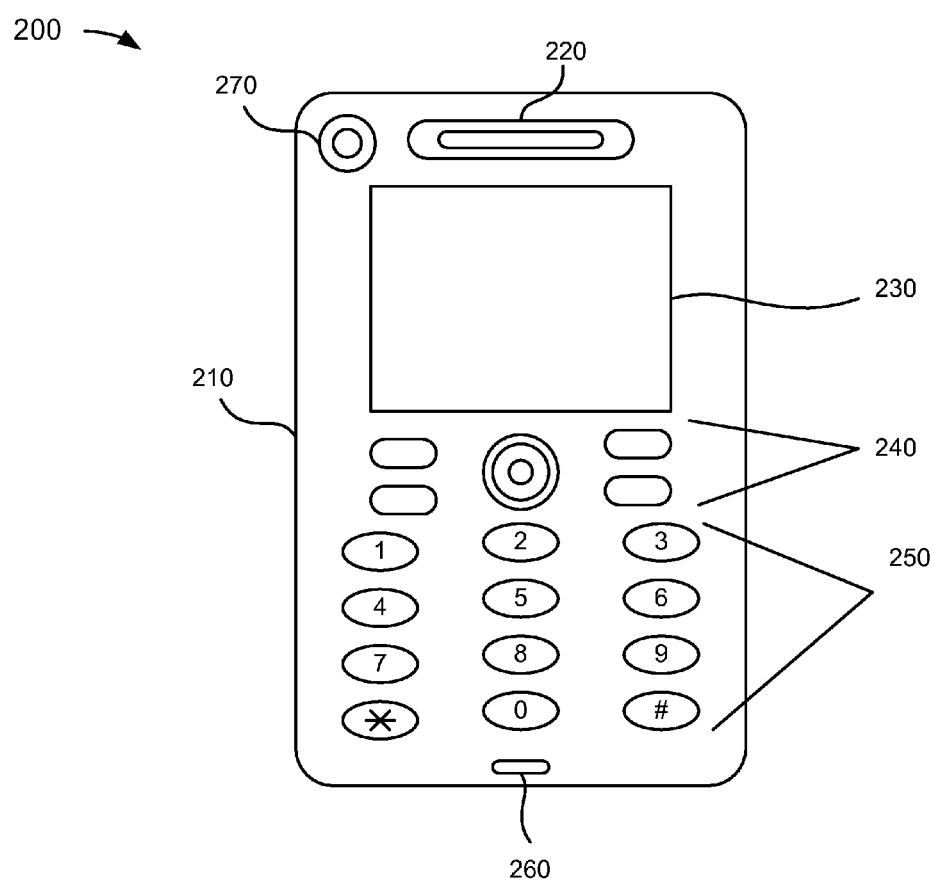
FIG. 2 is a diagram of an exemplary device in which systems and methods consistent with principles of the invention may be implemented.

FIG. 2 is a diagram of an exemplary device 200 according to an implementation consistent with principles of the invention. As shown in FIG. 2, device 200 may include a housing 210, a speaker 220, a display 230, control buttons 240, a keypad 250, a microphone 260, and a camera 270. Housing 210 may protect the components of device 200 from outside elements. Speaker 220 may provide audible information to a user of device 200. Display 230 may provide visual information to the user. For example, display 230 may provide information regarding incoming or outgoing calls, media, games, phone books, the current time, etc. In an implementation consistent with principles of the invention, display 230 may provide the user with information in the form of media capable of being identified (e.g., via facial or voice recognition). Control buttons 240 may permit the user to interact with device 200 to cause device 200 to perform one or more operations. Keypad 250 may include a standard telephone keypad. Microphone 260 may receive audible information from the user. Camera 270 may enable a user to capture and store video and/or images (e.g., pictures).

Figure 3:
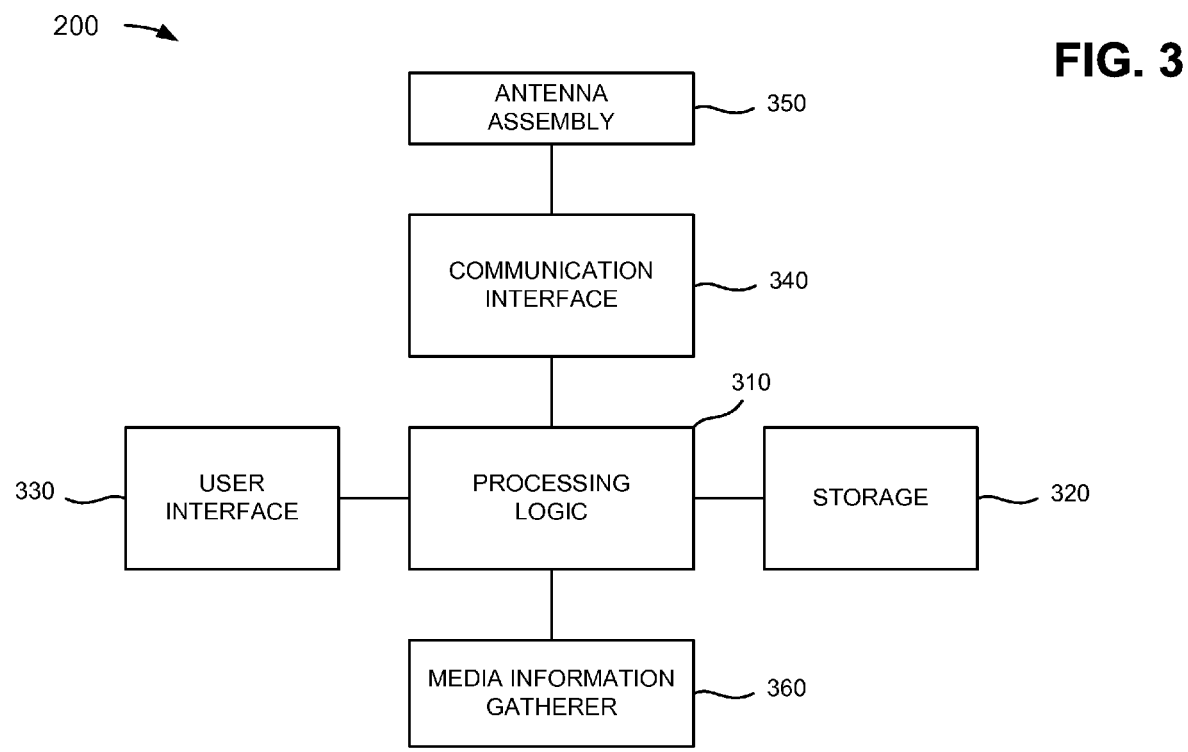
FIG. 3 is a diagram of exemplary components of the exemplary device of FIG. 2.

FIG. 3 is a diagram of exemplary components of device 200. As shown in FIG. 3, device 200 may include processing logic 310, storage 320, a user interface 330, a communication interface 340, an antenna assembly 350, and a media information gatherer 360. Processing logic 310 may include a processor, microprocessor, an application specific integrated circuit (ASIC), field programmable gate array (FPGA), or the like. Processing logic 310 may include data structures or software programs to control operation of device 200 and its components. Storage 320 may include a random access memory (RAM), a read only memory (ROM), and/or another type of memory to store data and instructions that may be used by processing logic 310.

User interface 330 may include mechanisms for inputting information to device 200 and/or for outputting information from device 200. Examples of input and output mechanisms might include a speaker (e.g., speaker 220) to receive electrical signals and output audio signals, a camera (e.g., camera 270) to receive image and/or video signals and output electrical signals, a microphone (e.g., microphone 260) to receive audio signals and output electrical signals, buttons (e.g., a joystick, control buttons 240 and/or keys of keypad 250) to permit data and control commands to be input into device 200, a display (e.g., display 230) to output visual information (e.g., information from camera 270), and/or a vibrator to cause device 200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air. Antenna assembly 350 may receive RF signals from communication interface 340 and transmit them over the air and receive RF signals over the air and provide them to communication interface 340. In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks).

Media information gatherer 360 may obtain media information from device 200. In one implementation, the media information may correspond to media stored on device 200 or received by device 200 (e.g., by communication interface 340). In this case, media information gatherer 360 may include a media storage device (e.g., storage 320), or a communication device (e.g., communication interface 340) capable of receiving media from another source (e.g., wired or wireless communication with an external media storage device). In another implementation, the media information may correspond to media captured or retrieved by device 200.

In this case, media information gatherer 360 may include a microphone (e.g., microphone 260) that may record audio information, and/or a camera (e.g., camera 270) that may record images and/or videos. The captured media may or may not be stored in a media storage device (e.g., storage 320).

As will be described in detail below, device 200, consistent with principles of the invention, may perform certain operations relating to the media identification (e.g., facial and/or voice recognition) based on the media information. Device 200 may perform these operations in response to processing logic 310 executing software instructions of an application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Media Identification Methods

FIGS. 4A-6B are diagrams of exemplary media identification methods according to implementations consistent with principles of the invention. The methods of FIGS. 4A-6B may be conveyed on device 200 (e.g., on display 230 of device 200).

Facial Recognition of Images and/or Video

Figure 4A:
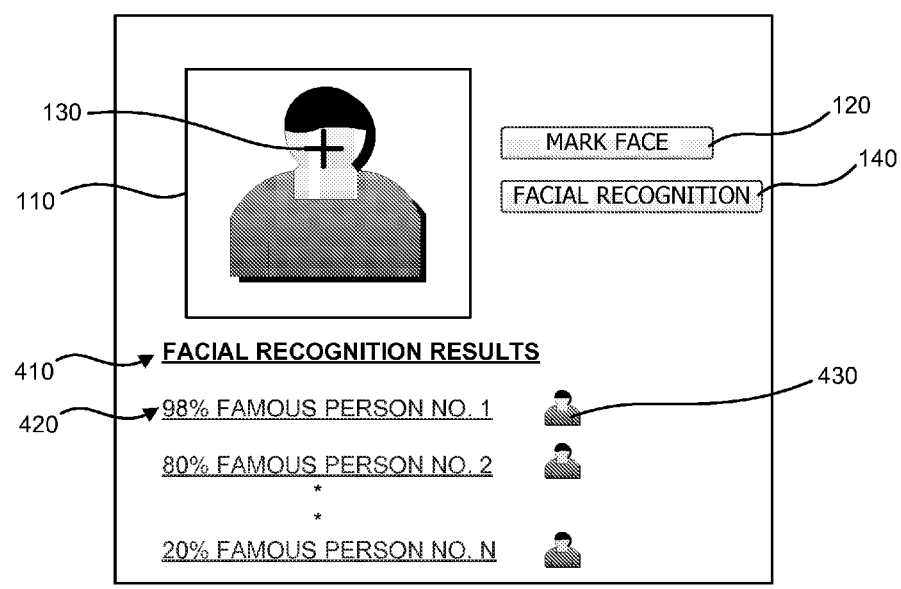
FIGS. 4A-6B are diagrams of exemplary media identification methods according to implementations consistent with principles of the invention.

As shown in FIG. 4A, a display 400 of a device (e.g., display 230 of device 200) may display image/video 110. Display 400 may include mark face item 120 (e.g. an icon, link, button, and/or other similar selection mechanisms), which upon selection may enable a user to mark (e.g., in one implementation, with cursor 130) a portion of the face of image/video 110. If the face is marked with cursor 130, a user may select facial recognition item 140 (e.g. an icon, link, button, and/or other similar selection mechanisms) provided on display 400 and perform facial recognition of image/video 110. In one implementation, facial recognition may be performed on image/video 110 with facial recognition software provided in the device (e.g., via processing logic 310 and storage 320 of device 200). In another implementation, facial recognition may be performed on image/video 110 with facial recognition software provided on a device communicating with device 200 (e.g., via communication interface 340).

Facial recognition software may include any conventional facial recognition software available. For example, facial recognition software may include facial recognition technologies used for verification and identification. Typical verification tasks may determine that people are who they claim to be before allowing entrance to a facility or access to data. In such cases, facial recognition software may compare a current image to images in a database. Match rates may be good with this method because such facial images may be captured under controlled circumstances (e.g., a photo shoot for a celebrity), yielding higher-quality images than pictures taken under more challenging circumstances.

Typical identification tasks may attempt to match unknown individuals from sources, such as a digital camera or a video camera, with images in a database. Identification matches may be more challenging because images obtained for this purpose may generally not be created with the subjects' cooperation under controlled conditions (e.g., taking a picture of a celebrity in a public place).

Current facial recognition software may use one or more of four basic methods: appearance-based, rule-based, feature-based, and/or texture-based. Appearance-based methods may measure the similarities of two or more images rather than attempting to extract facial features from the images. Rule-based methods may analyze facial components (e.g., the eyes, nose and mouth) to measure their relationship between images. Feature-based methods may analyze the characteristics of facial features (e.g., edge qualities, shape and skin color). Texture-based methods may examine the different texture patterns of faces. For each of these methods, facial recognition software may generate a template using algorithms to define and store data. When an image may be captured for verification or identification, facial recognition software may process the data and compare it with the template information.

In one exemplary implementation consistent with principles of the invention, facial recognition software from and/or similar to the software available from Cognitec Systems, NevenVision, Identix, and Acsys Biometrics' FRS Discovery may be used for performing facial recognition.

As further shown in FIG. 4A, results 410 of the facial recognition of image/video 110 may be provided on display 400. Results 410 may include a list of the person(s) matching the face shown in image/video 110. For example, in one implementation, results 410 may include a "famous person no. 1" 420 and an indication of the closeness of the match of person 420 (e.g., a 98% chance that person 420 matches with image/video 110). Results 410 may also include an image 430 (which may or may not be the same as image/video 110) for comparing image/video 110 to a known image of person 420. Results 410 may be arranged in various ways. For example, in one implementation, as shown in FIG. 4A, results 410 may provide a list of matching persons in descending order from the closest match to a person matching within a predetermined percentage (e.g., 50%). A user may select a person from results 410 in order to display identification information about the selected person. For example, in one implementation, each person (e.g., person 420) and/or each image 430 may provide a link to the identification information about the person.

Figure 4B:
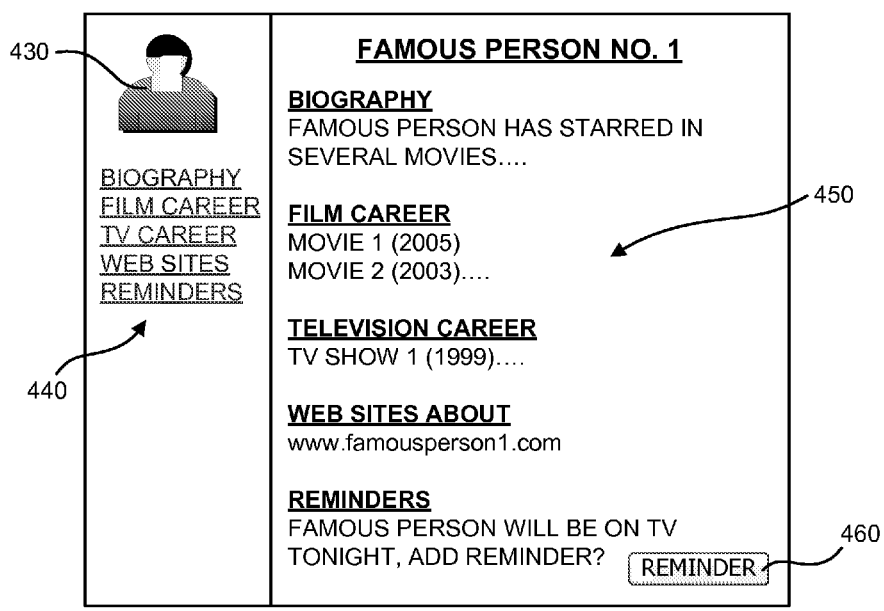

If a user selects a person from results (e.g., selects person 420), display 400 may provide the exemplary identification information shown in FIG. 4B. A wide variety of identification information may be provided. For example, if the person is a movie star, display 400 may provide a menu portion 440 and an identification information portion 450. Menu portion 440 may include, for example, selectable links (e.g., "biography," "film career," "TV career," "web sites," and/or "reminders") to portions of identification information portion 450. In the exemplary implementation shown in FIG. 4B, identification information portion 450 may include biographical information about the person (e.g., under the heading "Biography"), film career information about the person (e.g., under the heading "Film Career"), television career information about the person (e.g., under the heading "Television Career"), web site information about the person (e.g., under the heading "Web Sites About"), and/or reminder information (e.g., under the heading "Reminders"). The reminder information may include a reminder item 460 (e.g. an icon, link, button, and/or other similar selection mechanisms), which, upon selection by the user, may set a reminder that the person may be appearing on television tonight.

Although FIG. 4A shows marking a face of single person, in one implementation consistent with principles of the invention, multiple persons, places, or things may be marked for identification in a similar manner. Identification information may, accordingly, be displayed for each of the marked persons, places, or things. Furthermore, a user may not need to mark a face of an image or video, but rather, in one implementation, upon selection of facial recognition item 140, the face of the image or video may automatically be located in the image or video (e.g., by the facial recognition software).

Although FIG. 4B shows exemplary identification information, more or less identification information may be provided depending upon the media being identified. For example, if the person being identified is a musician, identification information may include album information, music video information, music download information, recommendations (e.g., other songs, videos, etc. available from the musician), etc. Furthermore, although FIG. 4B shows menu portion 440, display 400 may not include such a menu portion but may provide the identification information (e.g., identification information portion 450).

Voice Recognition of Audio

Figure 5A:
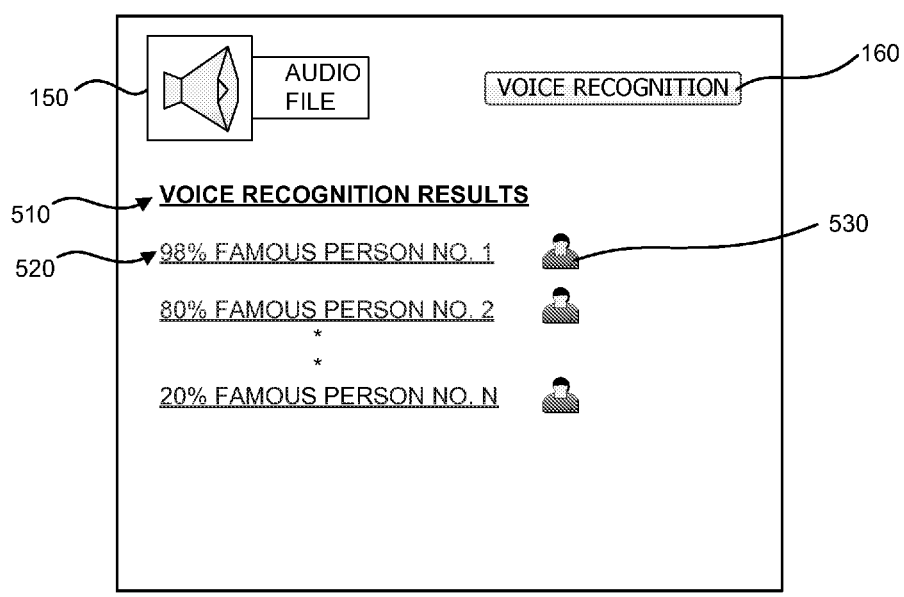

As shown in FIG. 5A, a display 500 of a device (e.g., display 230 of device 200) may display audio file item 150 (e.g. an icon, link, button, and/or other similar selection mechanisms), and/or the device (e.g., device 200) may play the audio file associated with audio file item 150. A user may select voice recognition item 160 (e.g. an icon, link, button, and/or other similar selection mechanisms) provided on display 500 and perform voice recognition of the audio file. In one implementation, voice recognition may be performed on the audio file with voice recognition software provided in the device (e.g., via processing logic 310 and storage 320 of device 200). In another implementation, voice recognition may be performed on the audio file with voice recognition software provided on a device communicating with device 200 (e.g., via communication interface 340).

Voice recognition software may include any conventional voice recognition software available. For example, voice recognition software may include any software capable of recognizing people from their voices. Voice recognition software may extract features from speech, model them and use them to recognize the person from his/her voice. Voice recognition software may use the acoustic features of speech that have been found to differ between individuals. These acoustic patterns may reflect both anatomy (e.g., size and shape of the throat and mouth) and learned behavioral patterns (e.g., voice pitch, and speaking style). Incorporation of learned patterns into voice templates (e.g., "voiceprints") has earned voice recognition its classification as a "behavioral biometric." Voice recognition software may employ three styles of spoken input: text-dependent, text-prompted, and/or text independent. Text-dependent input may involve matching the spoken word to that of a database of valid code words using pattern recognition techniques. Text-prompted input may involve prompting a user with a new key sentence every time the system is used and accepting the input utterance only when it decides that it was the registered speaker who repeated the prompted sentence. Text-independent input may involve preprocessing the voice and extracting features, matching features of a particular voice to that of templates stored in the database using pattern recognition, and speaker identification. Various technologies may be used to process and store voiceprints, including hidden Markov models, pattern matching algorithms, neural networks, matrix representation, and/or decision trees.

In one exemplary implementation consistent with principles of the invention, voice recognition software from and/or similar to the software available from Gold Systems, PIKA Technologies Inc., RightNow Technologies, SearchCRM, and/or SpeechPhone LLC may be used for performing voice recognition.

Although FIG. 5A shows voice recognition being performed on an audio file, in one implementation consistent with principles of the invention, voice recognition may be performed on audio being generated by a video being displayed by the device (e.g., device 200). For example, if a user is watching a movie on device 200, user may select voice recognition item 160 and perform voice recognition on a voice in the movie.

As further shown in FIG. 5A, results 510 of the voice recognition may be provided on display 500. Results 510 may include a list of the person(s) matching the voice of the audio file (or audio in a video). For example, in one implementation, results 510 may include a "famous person no. 1" 520 and an indication of the closeness of the match of the voice of person 520 (e.g., a 98% certainty that the voice of person 520 matches with the audio file or audio in a video). Results 510 may also include an image 530 of person 520 whose voice may be a match to the audio file (or audio in a video). Results 510 may be arranged in various ways. For example, as shown in FIG. 5A, results 510 may provide a list of matching persons in descending order from the closest match to a person matching within a predetermined percentage (e.g., 50%). A user may select a person from results 510 in order to display identification information about the selected person. For example, in one implementation, each person (e.g., person 520) and/or each image 530 may provide a link to the identification information about the person.

The audio file (or audio in a video) may be matched to a person in a variety of ways. For example, in one implementation, voice recognition software may extract features from speech in the audio file, model them, and use them to recognize the person(s) from his/her voice. In another implementation, voice recognition software may compare the words spoken in the audio file (or the music played by the audio file), and compare the spoken words (or music) to a database containing such words (e.g., famous lines from movies, music files, etc.). In still another implementation, voice recognition software may use of combination of the aforementioned techniques to match the audio file to a person.

Figure 5B:
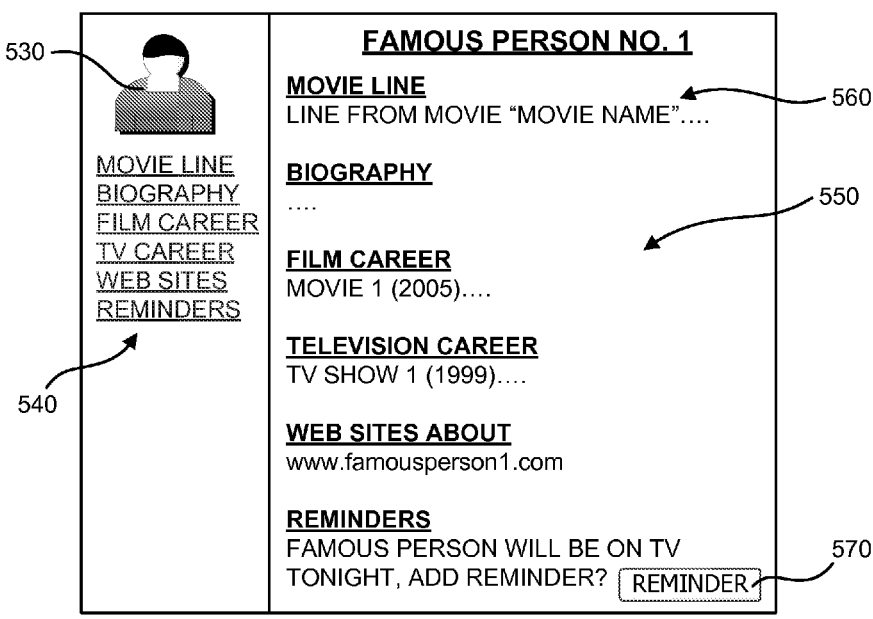

If a user selects a person from results (e.g., selects person 520), display 500 may provide the exemplary identification information shown in FIG. 5B. A wide variety of identification information may be provided. For example, if the person is a movie star, display 500 may provide a menu portion 540 and an identification information portion 550. Menu portion 540 may include, for example, selectable links (e.g., "movie line," "biography," "film career," "TV career," "web sites," and/or "reminders") to portions of identification information portion 550. In the exemplary implementation shown in FIG. 5B, identification information portion 550 may include movie line information 560 (e.g., under the heading "movie line"), biographical information about the person who spoke the line (e.g., under the heading "Biography"), film career information about the person (e.g., under the heading "Film Career"), television career information about the person (e.g., under the heading "Television Career"), web site information about the person (e.g., under the heading "Web Sites About"), and/or reminder information (e.g., under the heading "Reminders"). Movie line information 560 may, for example, provide the movie name and the line from the movie recognized by the voice recognition software. The reminder information may include a reminder item 570 (e.g. an icon, link, button, and/or other similar selection mechanisms), which, upon selection by the user, may set a reminder that the person may be appearing on television tonight. Although FIG. 5B shows menu portion 540, display 500 may not include such a menu portion but may provide the identification information (e.g., identification information portion 550).

Figure 5C:
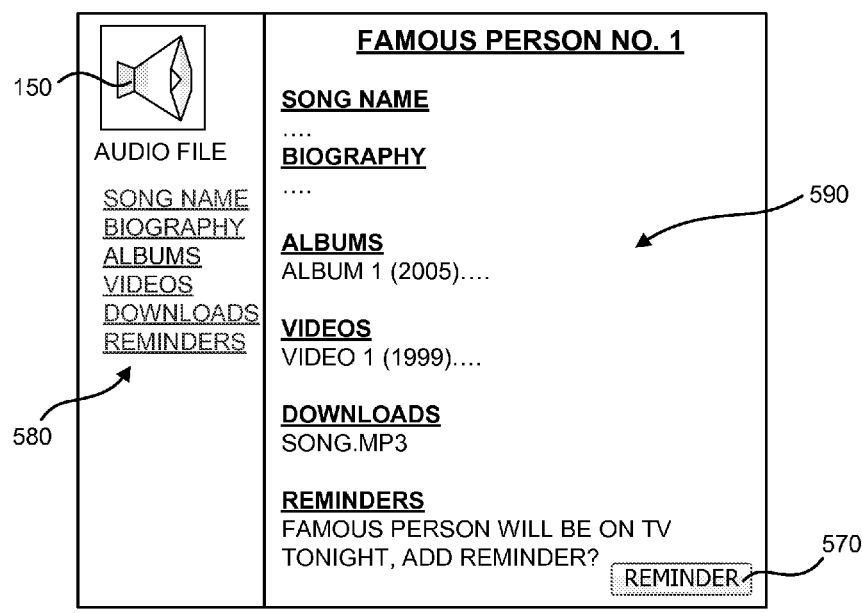

Although FIG. 5B shows exemplary identification information, more or less identification information may be provided depending upon the media being identified. For example, if the person (e.g., person 520) is a musician, then, in one implementation, as shown in FIG. 5C, the identification information may include information related to the musician. As shown in FIG. 5C, display 500 may provide a menu portion 580 and an identification information portion 590. Menu portion 580 may include, for example, selectable links (e.g., "song name," "biography," "albums," "videos," "downloads," and/or "reminders") to portions of identification information portion 590. In the exemplary implementation shown in FIG. 5C, identification information portion 590 may include song name information (e.g., under the heading "Song Name"), biographical information about the musician (e.g., under the heading "Biography"), album information about the musician (e.g., under the heading "Albums"), video information about the musician (e.g., under the heading "Videos"), downloadable information available for the musician (e.g., under the heading "Downloads"), and/or reminder information (e.g., under the heading "Reminders"). The reminder information may include reminder item 570 (e.g. an icon, link, button, and/or other similar selection mechanisms), which, upon selection by the user, may set a reminder that the musician may be appearing on television tonight. Although FIG. 5C shows menu portion 580, display 500 may not include such a menu portion but may provide the identification information (e.g., identification information portion 590).

Facial and/or Voice Recognition of Images/Video/Audio Captured by Device

In one implementation, as shown above in FIGS. 4A-5C, a device (e.g., device 200) may display and/or play back media that has been stored on device 200, stored on another device accessible by device 200, and/or downloaded to device 200. For example, in one implementation, device 200 may store the media in storage 320, and later play back the media. In another implementation, device 200 may connect to another device (e.g., a computer may connect to a DVD player) and play back the media stored on the other device. In still another implementation, device 200 may download the media (e.g., from the Internet) and play the media on device 200. Downloaded media may or may not be stored in storage 320 of device 200.

Figure 6A:
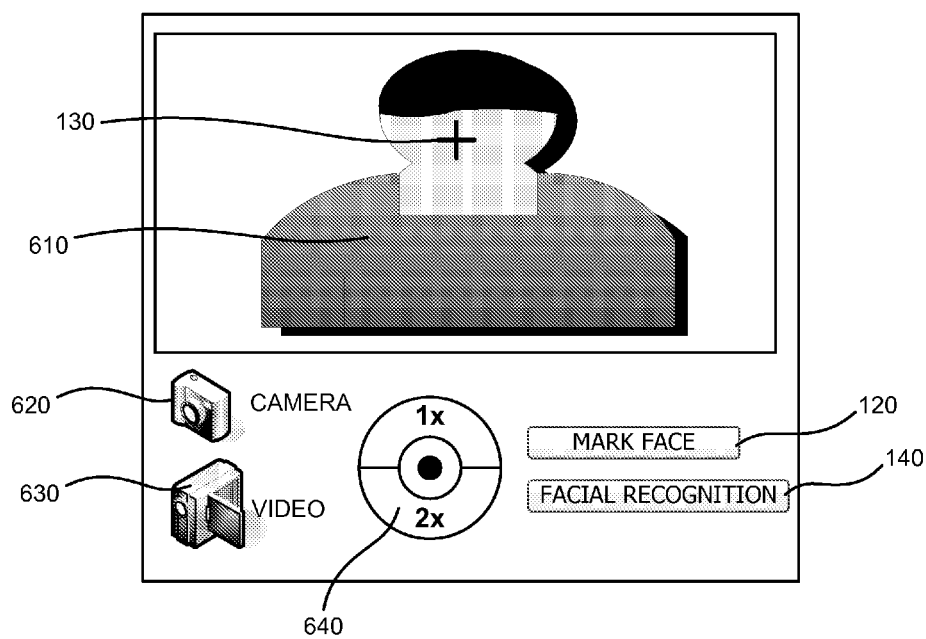
Figure 6B:
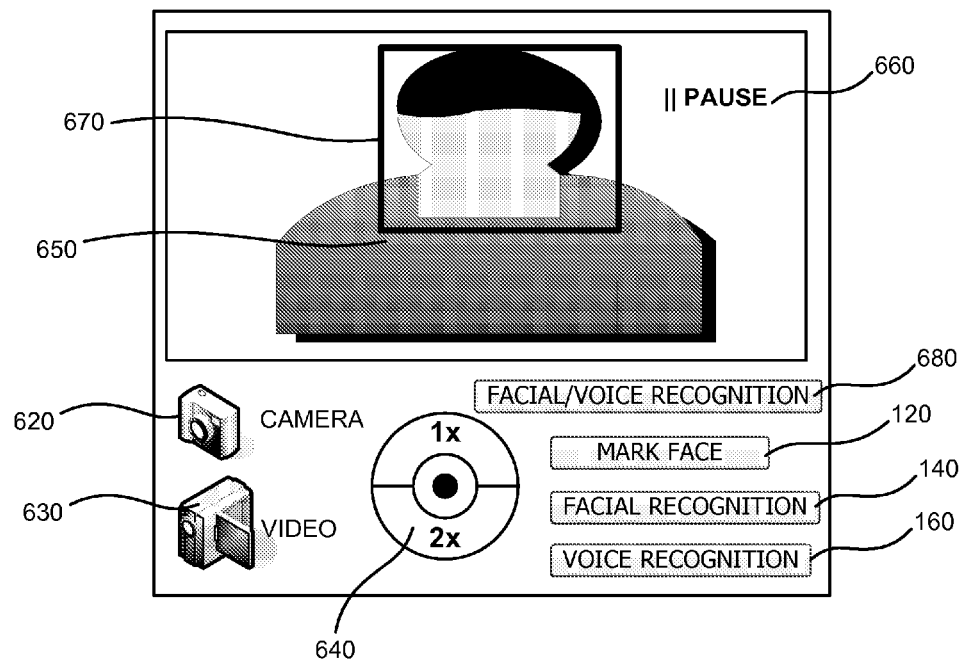

In another implementation, as shown in FIGS. 6A and 6B, a device (e.g., device 200) may capture the media and perform facial and/or voice recognition on the media in order to display matching identification information about the media. For example, as shown in FIG. 6A, a display 600 of a device (e.g., display 230 of device 200) may provide a mechanism to take pictures and/or record video (e.g., camera 270). Display 600 may include a camera item 620 (e.g. an icon, link, button, and/or other similar selection mechanisms), which upon selection may enable the user to capture an image 610 (e.g., a picture) with device 200 (e.g., via camera 270 of device 200). Display 600 may include a video item 630 (e.g. an icon, link, button, and/or other similar selection mechanisms), which upon selection may enable the user to capture video (e.g., a movie) with device 200 (e.g., via camera 270 of device 200). Display 600 may also include an optional mechanism 640 that may permit a user to enlarge an image and/or video being capture by device 200.

As further shown in FIG. 6A, display 600 may include mark face item 120 (e.g. an icon, link, button, and/or other similar selection mechanisms), which upon selection may enable a user to mark (e.g., in one implementation, with cursor 130) a portion of the face of image 610. If the face is marked with cursor 130, a user may select facial recognition item 140 (e.g. an icon, link, button, and/or other similar selection mechanisms) provided on display 600 and perform facial recognition of image 610, as described above in connection with FIGS. 4A and 4B.

As shown in FIG. 6B, a user may select video item 630 and capture a video 650 with device 200 (e.g., via camera 270 of device 200). A user may pause video 650 (e.g., as indicated by a pause text 660) upon selection of an input mechanism (e.g., control buttons 240 and/or keys of keypad 250) of device 200. If video 650 is paused, a user may select mark face item 120 which may enable a user to mark (e.g., in one implementation, with a box 670) a portion of the face of video 650. The paused frame in the video may be marked and/or a user may search backward and/or forward on the video to locate a frame of the video to mark. If the face is marked with box 670, a user may select facial recognition item 140 (e.g. an icon, link, button, and/or other similar selection mechanisms) provided on display 600 and perform facial recognition of video 650, as described above in connection with FIGS. 4A and 4B. In an alternative implementation, the face of a person in video 650 may be marked while video 650 is still playing, i.e., without pausing video 650. Additionally and/or alternatively, a user may select voice recognition item 160 while video 650 is still playing and perform voice recognition of the audio portion of video 650, as described above in connection with FIGS. 5A-5C.

In still another implementation, a user may select a facial/voice recognition item 680 (e.g. an icon, link, button, and/or other similar selection mechanisms) while video 650 is still playing and perform facial recognition of video 650 and/or voice recognition of the audio portion of video 650. The combination of facial and voice recognition of video 650 may, for example, be performed simultaneously. Alternatively, facial recognition of video 650 may be performed first, and voice recognition of the audio portion of video 650 may be performed second if the facial recognition does not provide a conclusive match (e.g., a predetermined level of accuracy may be set before voice recognition is performed). In still another example, voice recognition of the audio portion of video 650 may be performed first, and facial recognition of video 650 may be performed second if the voice recognition does not provide a conclusive match (e.g., a predetermined level of accuracy may be set before facial recognition is performed).

Although FIGS. 6A and 6B show capturing images and/or video with a device, the device may also capture audio (e.g., via microphone 260 of device 200). The captured audio may be stored on device 200 (e.g., in storage 320), or may not be stored on device 200. Voice recognition may be performed on the captured audio, as described above in connection with FIGS. 5A-5C.

In one implementation, a user of device 200 may control how media is displayed on device 200. For example, device 200 may include a user controlled media scaling mechanism (e.g., control buttons 240 and/or keys of keypad 250) that may permit a user to zoom in and out of any portion of media. User controlled zoom functions may be utilized with any of the methods discussed above in connection with FIGS. 4A-6B. Device 200 may further include a user controlled media control mechanism (e.g., control buttons 240 and/or keys of keypad 250) that may permit a user to start and stop media (e.g., audio playback on speaker 220 of device 200).

The exemplary media identification methods described above in connection with FIGS. 4A-6C may be applied in a variety of scenarios. The following scenarios provide some exemplary ways to implement the aspects of the present invention.

Person Identification

In one exemplary implementation, persons (e.g., celebrities, musicians, singers, movie stars, athletes, friends, and/or any person capable of being identified from media) may be identified with the exemplary media identification methods described above. For example, a movie star may be in a movie being displayed on device 200, and a user may wish to find out the name of the movie star and/or which other movies included the movie star. The user may perform facial and/or voice recognition on the movie (e.g., via the movie) to identify the movie star and locate other identification information (e.g., other films that include the movie star) about the movie star.

In another example, a singer or a musician may be in a music video displayed on device 200 and/or in a song playing on device 200, and the user may wish to find out the name of the singer/musician and/or the name of the song. The user may perform facial recognition (e.g., on the face of the singer/musician in the music video) and/or voice recognition (e.g., on the audio of the music video and/or on the song) to discover such identification information.

In still another example, a user may have a library of movies, music videos, and/or music on device 200, and when a user identifies a celebrity, device 200 may provide links to the movies, music videos, and/or music in the library that may contain the celebrity.

In a further example, identification information may include telephone number(s) and/or address(es), and device 200 may display images of people (e.g., friends of the user). When a user selects one of the images, device 200 may match the image with the telephones number(s) and/or address(es) of the person in the image, and display such information to the user. Device 200 may be programmed to automatically dial the telephone number of the person in the image.

In still a further example, the exemplary media identification methods described above may be used on people other than celebrities, as long as biometric information (e.g., facial information and/or voice information) is available for use by device 200. For example, if a person has facial information available (e.g., from criminal records, passports, etc.) and device 200 may access such information, then device 200 may identify such a person using the exemplary media identification methods. Such an arrangement may enable people to identify wanted criminals, terrorists, etc. in public places simply by capturing an image of the person and comparing the image to the biometric information available. This may enable civilians to assist in the identification and capture of known criminals, terrorists, etc.

Place Identification

In one exemplary implementation, places (buildings, landmarks, roads, bridges, and/or any place capable of being identified from media) may be identified with the exemplary media identification methods described above. For example, a user of device 200 may be trying to find his/her way around a city. The user may capture an image or a video of a building with device 200, and device 200 may identify the building with the exemplary media identification methods described above (e.g., the captured image may be compared to images of buildings in a database accessible by device 200). Identification of the building may provide the user with a current location in the city, and may enable the user to find his/her way around the city. In an exemplary implementation, device 200 may display a map to the user showing the current location based on the identified building, and/or may provide directions and an image of a destination of the user (e.g., a hotel in the city).

In another example, a user may be trying to identify a landmark in an area. The user may capture an image or a video of what is thought to be a landmark with device 200, and device 200 may identify the landmark with the exemplary media identification methods described above (e.g., the captured image may be compared to images of landmarks in a database accessible by device 200). Device 200 may also provide directions to other landmarks located near the landmark currently identified by device 200.

In still another example, a user may be able to obtain directions by capturing an image of a landmark (e.g., on a postcard) with device 200, and device 200 may identify the location of the landmark with the exemplary media identification methods described above (e.g., the captured image may be compared to images of landmarks in a database accessible by device 200).

In still a further example, a user may be able to obtain directions by capturing an image or a video of a street sign(s) with device 200, and device 200 may identify the location of street(s) with the exemplary media identification methods described above (e.g. the name of the street in the captured image may be compared to names of streets in a database accessible by device 200). Device 200 may also provide a map showing streets, buildings, landmarks, etc. surrounding the identified street.

Place identification may work in combination with a GPS device (e.g., provided in device 200) to give some location of device 200. For example, there may be a multitude of "First Streets." In order to determine which "First Street" a user is near, the combination of media identification and a GPS device may permit the user to properly identify the location (e.g., town, city, etc.) of the "First Street" based GPS signals.

Such place identification techniques may utilize "image/video recognition" (e.g., a captured image and/or video of a place may be compared to images and/or videos contained in a database accessible by device 200), rather than facial recognition. As used herein, however, "facial recognition" may be considered a subset of "image/video recognition."

Thing Identification

In one exemplary implementation, things (e.g., animals, print media, cartoon characters, film characters, plants, trees, and/or any "thing" capable of being identified from media) may be identified with the exemplary media identification methods described above. For example, a user of device 200 may be in the wilderness and may see an animal he/she wishes to identify. The user may capture an image, video, and/or sound of the animal with device 200, and device 200 may identify the animal with the exemplary media identification methods described above (e.g., the captured image, video, and/or sound may be compared to animal images and/or sounds in a database accessible by device 200). Identification of an animal may ensure that the user does not get too close to dangerous animals, and/or may help an animal watcher (e.g., a bird watcher) or a science teacher identify unknown animals in the wilderness.

In another example, a user of device 200 may wish to identify a plant (e.g., to determine if the plant is poison ivy, for scientific purposes, for educational purposes, etc.). The user may capture an image and/or a video of the plant with device 200, and device 200 may identify the plant with the exemplary media identification methods described above (e.g., the captured image and/or video may be compared to plant images in a database accessible by device 200).

In a further example, a user of device 200 may be watching a cartoon and may wish to identify a cartoon character. The user may perform facial and/or voice recognition on the cartoon (e.g., via the cartoon) to identify the cartoon character and locate other identification information (e.g., other cartoons that include the character) about the cartoon character.

Such thing identification techniques may utilize "image/video recognition" (e.g., a captured image and/or video of a thing may be compared to images and/or videos contained in a database accessible by device 200), rather than facial recognition. As used herein, however, "facial recognition" may be considered a subset of "image/video recognition." Further, such thing identification techniques may utilize "audio recognition" (e.g., captured audio of a thing may be compared to audio contained in a database accessible by device 200), rather than voice recognition. As used herein, however, "voice recognition" may be considered a subset of "audio recognition."

Alternative/Additional Techniques

The facial recognition, voice recognition, image/video recognition, and/or voice recognition described above may be combined with other techniques to identify media. For example, in one implementation, any of the recognition techniques may be automatically running in the background while media is playing and/or being displayed. For example, facial and/or voice recognition may be automatically running in the background while a movie is playing, and/or may identify media objects (e.g., actors, actresses, etc.) in the movie. This may enable the recognition technique to obtain an ideal selection in the movie (e.g., the best face shot of an actor) for facial and/or voice recognition, and may improve the identification method.

In another implementation, tags (e.g., keywords which may act like a subject or category) provided in the media (e.g., tags identifying a movie, video, song, etc.) may be used in conjunction with any of the recognition techniques. Such tags may help narrow a search for identification of media. For example, a program guide on television may provide such tags, and may be used to narrow a search for media identification. In another example, once media is identified, tags may be added to the identification information about the media.

In still another implementation, image/video recognition may be used to scan the text of print media (e.g., books, magazines, etc.). The print media may be identified through optical character recognition (OCR) of the captured image and/or video. For example, a captured text image may be recognized with OCR and compared to a text database to see if the captured text appears in the text database.

Exemplary Processes

Figure 7A:
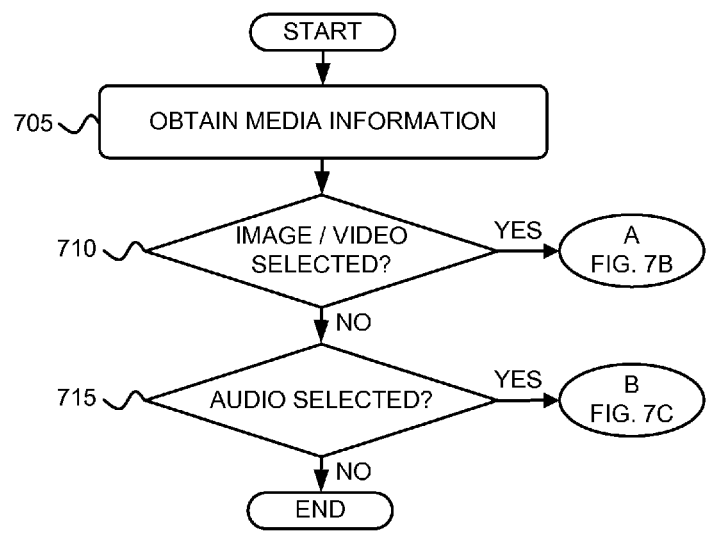
FIGS. 7A-8 are flowcharts of exemplary processes according to implementations consistent with principles of the invention.
Figure 7B:
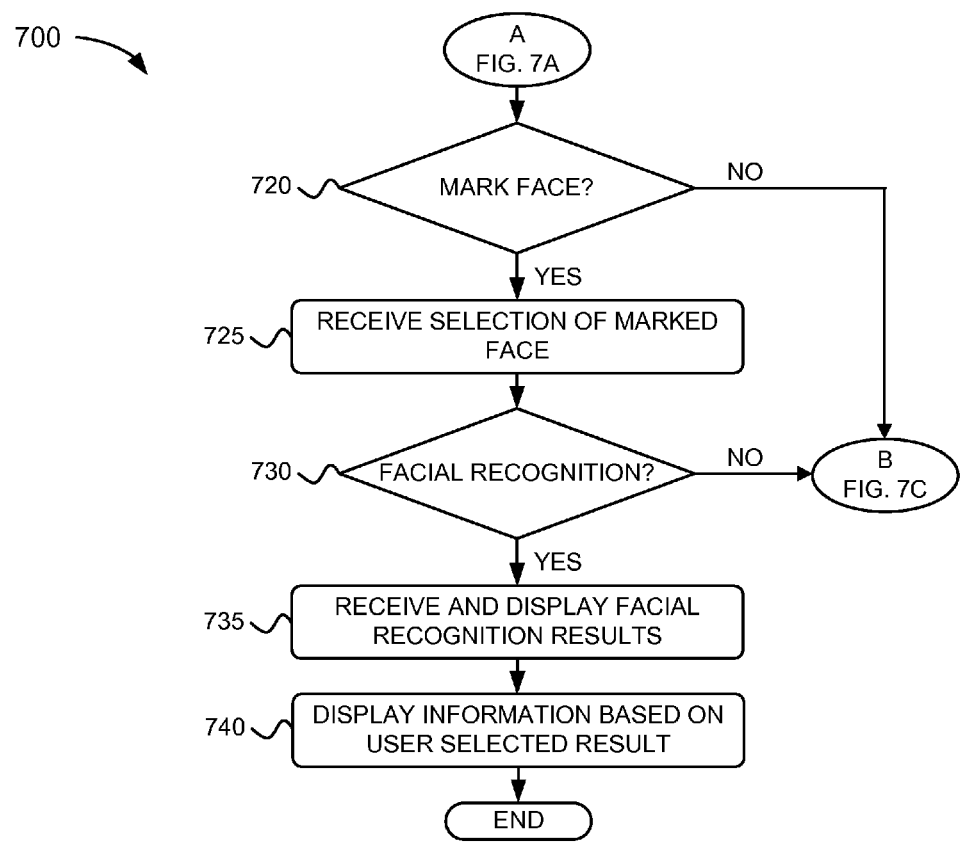
Figure 7C:
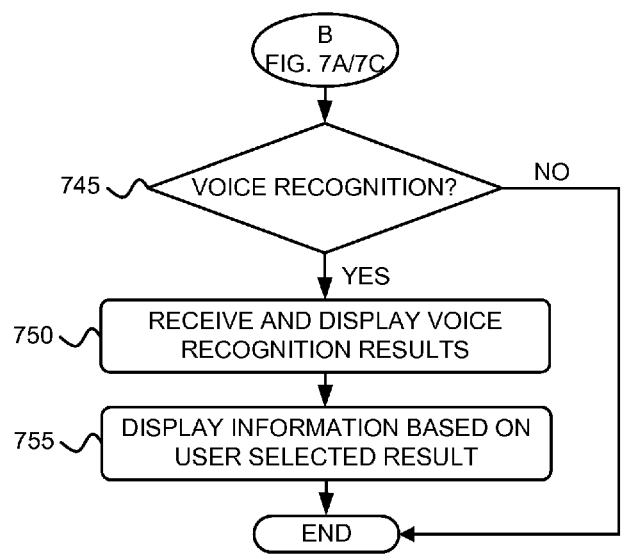
Figure 8:
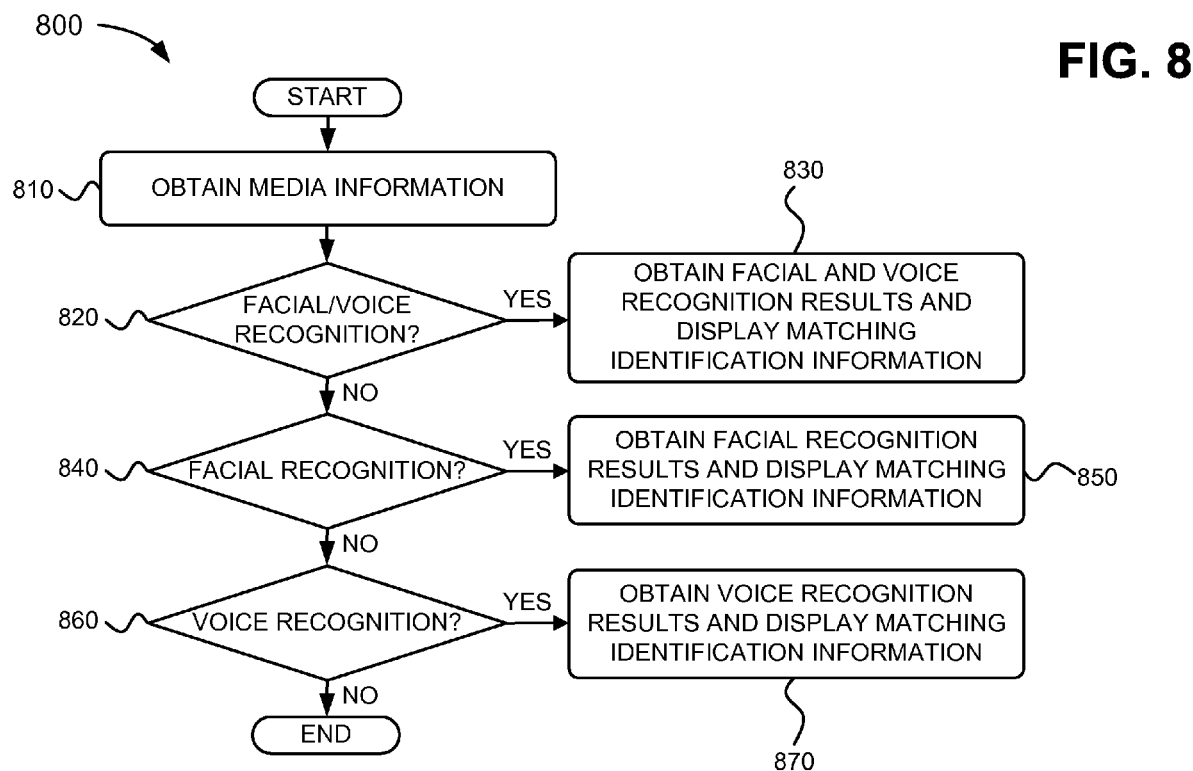

FIGS. 7A-8 are flowcharts of exemplary processes according to implementations consistent with principles of the invention. The process of FIG. 7A may generally be described as identification of stored media. The process of FIG. 7B may generally be described as identification of stored media based on facial recognition. The process of FIG. 7C may generally be described as identification of stored media based on voice recognition. The process of FIG. 8 may generally be described as identification of captured media based on facial and/or voice recognition.

Process for Identification of Stored Media

As shown in FIG. 7A, a process 700 may obtain media information (block 705). For example, in one implementation described above in connection with FIG. 3, the media information may correspond to media stored on device 200 or received by device 200 (e.g., by communication interface 340). In this case, media information gatherer 360 may include a media storage device (e.g., storage 320), or a communication device (e.g., communication interface 340) capable of receiving media from another source.

As further shown in FIG. 7A, process 700 may determine whether an image or a video has been selected as the media (block 710). If an image or a video has been selected (block 710—YES), then the blocks of FIG. 7B may be performed. For example, in one implementation described above in connection with FIG. 1, display 100 of a device may include image/video 110 selected by a user. For example, image/video 110 may be a movie or a music video selected by a user and currently being displayed on display 100.

If an image or a video has not been selected (block 710—NO), process 700 may determine whether an audio file has been selected as the media (block 715). If an audio file has been selected (block 715—YES), then the blocks of FIG. 7C may be performed. For example, in one implementation described above in connection with FIG. 1, display 100 may include audio file item 150 (e.g. an icon, link, button, and/or other similar selection mechanisms), which may be displayed when a user is listening to an audio file. For example, a user may listen to music (e.g., digital music, MP3, MP4, etc.) on the device. If an audio file has not been selected (block 715—NO), process 700 may end.

Process for Identification of Stored Media Based on Facial Recognition

As shown in FIG. 7B, process 700 may determine whether a face of an image or a video is to be marked (block 720). For example, in one implementation described above in connection with FIGS. 1 and 4A, display 100 may include mark face item 120 (e.g. an icon, link, button, and/or other similar selection mechanisms), which upon selection may enable a user to mark (e.g., with cursor 130) a portion of the face of image/video 110. If a face is to be marked (block 720—YES), process 700 may mark the face in the selected image or video (block 725). If a face is not to be marked (block 720—NO), process 700 may perform the blocks of FIG. 7C.

As further shown in FIG. 7B, process 700 may determine whether facial recognition is to be performed (block 730). If facial recognition is not to be performed (block 730—NO), process 700 may perform the blocks of FIG. 7C. If facial recognition is to be performed (block 730—YES), process 700 may receive and display facial recognition results to the user (block 735). For example, in one implementation described above in connection with FIGS. 4A and 4B, if the face is marked with cursor 130, a user may select facial recognition item 140 (e.g. an icon, link, button, and/or other similar selection mechanisms) provided on display 400 and perform facial recognition of image/video 110. In one implementation, facial recognition may be performed on image/video 110 with facial recognition software provided in the device (e.g., via processing logic 310 and storage 320 of device 200). In another implementation, facial recognition may be performed on image/video 110 with facial recognition software provided on a device communicating with device 200 (e.g., device 200 may send the marked face to another, which performs facial recognition and returns the results to device 200). Results 410 of the facial recognition of image/video 110 may be provided on display 400. Results 410 may include a list of the person(s) matching the face shown in image/video 110.

Process 700 may display identification information based on a user selected facial recognition result (block 740). For example, in one implementation described above in connection with FIG. 4B, if a user selects a person from results (e.g., selects person 420), display 400 may provide the exemplary identification information shown in FIG. 4B. A wide variety of identification information may be provided. For example, if the person is a movie star, display 400 may provide a menu portion 440 and an identification information portion 450. Menu portion 440 may include, for example, selectable links to portions of identification information portion 450. In the exemplary implementation shown in FIG. 4B, identification information portion 450 may include biographical information about the person, film career information about the person, television career information about the person, web site information about the person, and/or reminder information.

Process for Identification of Stored Media Based on Voice Recognition

If an audio file is selected (block 715—YES, FIG. 7A), a face is not marked (block 720—NO, FIG. 7B), and/or facial recognition is not performed (block 730—NO, FIG. 7B), process 700 may perform the blocks of FIG. 7C. As shown in FIG. 7C, process may determine if voice recognition is to be performed (block 745). For example, in one implementation described above in connection with FIGS. 5A and 5B, a user may select voice recognition item 160 (e.g. an icon, link, button, and/or other similar selection mechanisms) provided on display 500 and perform voice recognition of the audio file or audio being generated by a video. In one implementation, voice recognition may be performed on the audio file with voice recognition software provided in the device (e.g., via processing logic 310 and storage 320 of device 200). In another implementation, voice recognition may be performed on the audio file with voice recognition software provided on a device communicating with device 200 (e.g., via communication interface 340). Results 510 of the voice recognition may be provided on display 500. Results 510 may include a list of the person(s) matching the voice of the audio file (or audio in a video).

If voice recognition is not to be performed (block 745—NO), process 700 may end. If voice recognition is to be performed (block 745—YES), process 700 may receive and display voice recognition results to the user (block 750).

As further shown in FIG. 7C, process 700 may display identification information based on the user selected voice recognition results (block 755). For example, in one implementation described above in connection with FIG. 5B, if a user selects a person from results (e.g., selects person 520), display 500 may provide the exemplary identification information shown in FIG. 5B. A wide variety of identification information may be provided. If the person is a movie star, display 500 may provide a menu portion 540 and an identification information portion 550. Menu portion 540 may include, for example, selectable links to portions of identification information portion 550. In the exemplary implementation shown in FIG. 5B, identification information portion 550 may include movie line information 560, biographical information about the person who spoke the line, film career information about the person, television career information about the person, web site information about the person, and/or reminder information.

Process for Identification of Captured Media Based on Facial and/or Voice Recognition As shown in FIG. 8, a process 800 may obtain media information (block 810). For example, in one implementation described above in connection with FIG. 3, the media information may correspond to media retrieved or captured by device 200. In this case, media information gatherer 360 may include a microphone (e.g., microphone 260) that may record audio information, and/or a camera (e.g., camera 270) that may record images and/or videos.

If facial and voice recognition are to be performed on the captured media (block 820—YES), process 800 may obtain facial and voice recognition results for the captured media and may display matching identification information (block 830). For example, in one implementation described above in connection with FIG. 6B, a user may select video item 630 and capture video 650 with device 200 (e.g., via camera 270 of device 200). If video 650 is paused, a user may select mark face item 120 which may enable a user to mark (e.g., in one implementation, with a box 670) a portion of the face of video 650. If the face is marked, a user may select facial recognition item 140 provided on display 600, cause facial recognition of video 650 to be performed, and display matching identification information, as described above in connection with FIGS. 4A and 4B. In an alternative implementation, the face of a person in video 650 may be marked while video 650 is still playing, i.e., without pausing video 650. Additionally, a user may select voice recognition item 160 while video 650 is still playing, perform voice recognition of the audio portion of video 650, and display matching identification information, as described above in connection with FIGS. 5A-5C. In still another implementation, a user may select facial/voice recognition item 680 while video 650 is still playing and cause facial recognition of video 650 and/or voice recognition of the audio portion of video 650 to be performed. The combination of facial and voice recognition of video 650 may, for example, be performed simultaneously or sequentially (e.g., with facial recognition being performed first, and voice recognition being performed second if the facial recognition does not provide a conclusive match, and vice versa).

As further shown in FIG. 8, if facial and voice recognition is not to be performed on the captured media (block 820—NO), process 800 may determine whether facial recognition is to be performed on the captured media (block 840). If facial recognition is to be performed on the captured media (block 840—YES), process 800 may obtain facial recognition results for the captured media and may display matching identification information (block 850). For example, in one implementation described above in connection with FIG. 6A, display 600 may include mark face item 120 (e.g. an icon, link, button, and/or other similar selection mechanisms), which upon selection may enable a user to mark (e.g., in one implementation, with cursor 130) a portion of the face of image 610. If the face is marked with cursor 130, a user may select facial recognition item 140 provided on display 600, cause facial recognition of image 610 to be performed, and display matching identification information, as described above in connection with FIGS. 4A and 4B.

As further shown in FIG. 8, if facial recognition is not to be performed on the captured media (block 840—NO), process 800 may determine whether voice recognition is to be performed on the captured media (block 860). If voice recognition is to be performed on the captured media (block 860—YES), process 800 may obtain voice recognition results for the captured media and may display matching identification information (block 870). For example, in one implementation described above in connection with FIGS. 6A and 6B, the device may capture audio (e.g., via microphone 260 of device 200). The captured audio may be stored on device 200 (e.g., in storage 320), or may not be stored on device 200. Voice recognition may be performed on the captured audio and matching identification information may be displayed, as described above in connection with FIGS. 5A-5C.

CONCLUSION

Implementations consistent with principles of the invention may identify media based on facial and/or voice recognition results for the media, and may display identification information based on the facial and/or voice recognition results. By using media identification (e.g., facial recognition technology to identify a person(s) in images and/or video, and/or voice recognition technology to identify a person(s) in audio, e.g., a sound byte from a movie), a person(s) may be identified and information about the person(s) may be displayed on a device.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7A-8, the order of the acts may be modified in other implementations consistent with principles of the invention. Further, non-dependent acts may be performed in parallel. Still further although implementations described above discuss use of facial and voice biometrics, other biometric information (e.g., fingerprints, eye retinas and irises, hand measurements, handwriting, gait patterns, typing patterns, etc.) may be used to identify media and provide matching identification information. Still even further, although the Figures show facial and voice recognition results, in one implementation, facial and/or voice recognition may not provide results, but instead may provide identification information for the closest matching media found by the facial and/or voice recognition.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a mobile device, the method comprising:
   obtaining media via the mobile device;
   identifying an object, in the media, using image recognition and audio recognition, where identifying the object includes:
   performing the image recognition in response to obtaining the media, and
   performing the audio recognition in response to the image recognition failing to identify the object within a particular level of accuracy;
   comparing the identified object to a plurality of media objects;
   determining that at least one of the plurality of media objects matches the identified object within the particular level of accuracy; and
   displaying an ordered list that includes the identified at least one of the plurality of media objects and a level of accuracy associated with each of the identified at least one of the plurality of media objects.

2. The method of claim 1, where obtaining the media via the mobile device includes:
   receiving the media from another device via a network.

3. The method of claim 1, where obtaining the media via the mobile device includes:
   capturing the media with an input device of the mobile device.

4. The method of claim 1, further comprising:
   marking a face in the object, where the face is used to identify the object through the image recognition.

5. The method of claim 1, further comprising:
   receiving a selection from the determined at least one of the plurality of media objects; and
   displaying identification information associated with the selection.

6. The method of claim 5, where the identification information comprises information identifying one of a person, a place, or a thing associated with the selection.

7. The method of claim 5, where the identification information comprises at least one of:
   biographical information about the identified object;
   a link to information about the identified object; or
   recommended media objects associated with the identified object.

8. The method of claim 1, where the media includes one of:
   an image file;
   an audio file;
   a video file; or
   an animation file.

9. The method of claim 1, where the object includes one of:
   a person;
   a place; or
   a thing.

10. A device comprising:
    a processor to:
    obtain media,
    identify an object in the media using facial recognition and voice recognition,
    where the processor, when identifying the object in the media, is further to:
    perform the facial recognition in response to obtaining the media, and
    perform the voice recognition in response to the facial recognition failing to identify the object within a particular level of accuracy,
    compare the identified object to a plurality of media objects,
    display an ordered list of the plurality of media objects that match the identified object within the particular level of accuracy,
    display a level of accuracy associated with each of the matching plurality of media objects,
    receive a selection of one of the matching plurality of media objects, and
    display identification information associated with the selection of one of the matching plurality of media objects.

11. The device of claim 10, where the device comprises a media information gatherer that provides the media to the processor, where the media information gatherer includes at least one of:
    a camera;
    a microphone;
    a media storage device; or
    a communication device.

12. The device of claim 10, where the processor, when identifying the object through facial recognition, is further to determine a location of a face in the object.

13. The device of claim 10, where the processor, when identifying the object through facial recognition, is further to receive a user input identifying a location of a face in the object.

14. A method comprising:
    obtaining video on a device;
    providing, by the device and while the video is playing on the device, an identification of an object in the video, where the identification of the object is performed using facial recognition and voice recognition, where providing the identification of the object in the video includes:
    performing the facial recognition in response to playing the video, and
    performing the voice recognition in response to the facial recognition failing to identify the object within a particular level of accuracy;
    comparing, by the device, the identified object to a plurality of media objects;
    displaying, by the device, an ordered list of the plurality of media objects that match the identified object within the particular level of accuracy; and
    displaying, on the device, a particular level of accuracy associated with each of the matching plurality of media objects.

15. The method of claim 14, where the facial recognition includes determining, in the video, a location of a face associated with the object.

* * * * *